(12) United States Patent
Yin et al.

(10) Patent No.: US 11,803,594 B2
(45) Date of Patent: Oct. 31, 2023

(54) INFORMATION DISPLAY METHOD AND APPARATUS

(71) Applicant: Huawei Technologies Co. Ltd., Shenzhen (CN)

(72) Inventors: Wenshuai Yin, Shenzhen (CN); Lin Cao, Nanjing (CN); Jinxian Wu, Shenzhen (CN); Tao Yi, Shenzhen (CN); Yuhua Wang, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 0 days.

(21) Appl. No.: 17/285,404

(22) PCT Filed: Oct. 15, 2018

(86) PCT No.: PCT/CN2018/110293
§ 371 (c)(1),
(2) Date: Apr. 14, 2021

(87) PCT Pub. No.: WO2020/077503
PCT Pub. Date: Apr. 23, 2020

(65) Prior Publication Data
US 2022/0058225 A1  Feb. 24, 2022

(51) Int. Cl.
*G06F 16/9535* (2019.01)
*G06F 16/903* (2019.01)
*G06F 16/9538* (2019.01)

(52) U.S. Cl.
CPC .... *G06F 16/90344* (2019.01); *G06F 16/9535* (2019.01); *G06F 16/9538* (2019.01)

(58) Field of Classification Search
CPC . G06F 16/90335–9035; G06F 16/9535; G06F 16/9538
See application file for complete search history.

(56) References Cited

U.S. PATENT DOCUMENTS

2006/0179114 A1  8/2006  Deeds
2009/0174668 A1  7/2009  Cho
(Continued)

FOREIGN PATENT DOCUMENTS

| CN | 104239313 A | 12/2014 |
| CN | 104573044 A | 4/2015 |

(Continued)

OTHER PUBLICATIONS

Jiang "Take you to enjoy the smart life Hisense AI phone H20," Computer and Network, Total 3 pages (2018). With an English Abstract.
(Continued)

*Primary Examiner* — Grace Park
(74) *Attorney, Agent, or Firm* — Leydig, Voit & Mayer, Ltd.

(57) ABSTRACT

An information display method and an apparatus are described wherein a terminal obtains a first operation entered by a user. The terminal further obtains at least one key character based on the first operation. The terminal further determines that characteristic information associated with the key character is stored, and displays target information associated with the characteristic information. The target information is information that is in a set of information associated with the key character and that is associated with the characteristic information. The method can improve information display precision.

21 Claims, 9 Drawing Sheets

(56) References Cited

U.S. PATENT DOCUMENTS

| | | | | |
|---|---|---|---|---|
| 2012/0150888 A1* | 6/2012 | Hyatt | ............... | G06F 16/335 |
| | | | | 707/758 |
| 2012/0226704 A1* | 9/2012 | Boland | ............... | G06F 16/9535 |
| | | | | 707/E17.082 |
| 2012/0331049 A1* | 12/2012 | Deeter | ............... | G06Q 50/01 |
| | | | | 709/204 |
| 2013/0024809 A1* | 1/2013 | Voonna | ............... | G06F 3/0233 |
| | | | | 715/863 |
| 2013/0339464 A1* | 12/2013 | Goudarzi | ............... | H04L 51/48 |
| | | | | 709/227 |
| 2014/0135069 A1 | 5/2014 | Jung et al. | | |
| 2014/0351034 A1* | 11/2014 | Lellouche | ............... | G06Q 30/0222 |
| | | | | 705/14.23 |
| 2014/0362005 A1 | 12/2014 | Yazawa et al. | | |
| 2015/0160856 A1 | 6/2015 | Jang et al. | | |
| 2016/0103830 A1 | 4/2016 | Cheong et al. | | |
| 2016/0162172 A1* | 6/2016 | Rathod | ............... | G06F 9/451 |
| | | | | 715/747 |
| 2016/0203360 A1 | 7/2016 | Alvarez | | |
| 2018/0004397 A1 | 1/2018 | Mazzocchi et al. | | |
| 2018/0260102 A1* | 9/2018 | Kim | ............... | G06F 40/166 |
| 2019/0286683 A1* | 9/2019 | Kittur | ............... | G06F 16/9577 |
| 2019/0379759 A1* | 12/2019 | Bellinger | ............... | H04L 67/34 |

FOREIGN PATENT DOCUMENTS

| | | |
|---|---|---|
| CN | 104980549 A | 10/2015 |
| CN | 105580326 A | 5/2016 |
| CN | 105843817 A | 8/2016 |
| CN | 106302922 A | 1/2017 |
| CN | 106412201 A | 2/2017 |
| CN | 107885346 A | 4/2018 |
| CN | 107888749 A | 4/2018 |
| CN | 108197221 A | 6/2018 |
| EP | 2405631 A1 | 1/2012 |
| JP | H10155038 A | 6/1998 |
| JP | 2002271476 A | 9/2002 |
| JP | 2009075815 A | 4/2009 |
| JP | 2013130954 A | 7/2013 |
| JP | 2015053556 A | 3/2015 |
| KR | 20110029479 A | 3/2011 |
| KR | 20180112031 A | 10/2018 |
| WO | 2014000385 A1 | 1/2014 |
| WO | 2018004730 A1 | 1/2018 |

OTHER PUBLICATIONS

Jiang "Real bezel-less screen Vivo NEX is officially released," Computer and Network, Total 3 pages (2018). With an English Abstract.

Zhang "Honor Play accelerates phone performance with "turbo"," Computer and Network, Total 3 pages (2018). With an English Abstract.

"Office of the Leading Group of Cyber Security and Informatization of Hebei Provincial Committee of the Communist Party of China," Total 3 pages, Hebei Science and Technology Press (2014). With an English Abstract.

Fusongbai "Android Development from Getting Started to Mastering," Total 4 pages (2012). With English Abstract.

Fu Limei "Android Mobile Application Development Project Tutorial," Total 7 pages (2017). With English Abstract.

Beijing Hope Computer Company, "IN Touch" HMI Application Generator User Guide and Reference Manual Rev. 2, Total 4 pages (1991). With English Abstract.

Sina Mobile, "Triangle beast: Smart screen similar to "big bang" will log into 500 million mobile phones next year," http://news.eeworld.com.cn/xfdz/2018/ic-news092689501.html, Total 3 pages (Sep. 26, 2018).

Nine-day Technology, "Proficient in WeChat applications, skills, and marketing," Total 1 page (2014). English Abstract.

Meng Ping, "Huawei's 7S Pink Edition is full of girls," Total 2 pages (2018). With an English Abstract.

Shui Zhenxiang, "Smart screen recognition: read between the lines—understand what you want," http://www.360doc.com/content/18/0417/09/3046928_746301572.shtml. Total 5 pages (Apr. 17, 2018).

Chen Pengquan, "Tencent, Not Just QQ: Why Tencent Succeeded," Total 1 page (2014). English Abstract.

Fang et al., "Mobile augmented reality system based on smart phone texts," Journal of Zhengzhou University of Light Industry (Natural Science), vol. 28, No. 3, Total 5 pages (Jun. 2013).

\* cited by examiner

INFORMATION DISPLAY METHOD AND APPARATUS

CROSS-REFERENCE TO RELATED APPLICATIONS

This application is a national stage of International Application No. PCT/CN2018/110293, filed on Oct. 15, 2018, which is hereby incorporated by reference in its entirety.

TECHNICAL FIELD

This application relates to the field of intelligent terminals, and in particular, to an information display method and an apparatus.

BACKGROUND

Currently, an information display technology based on optical character recognition (OCR) and a Chinese word segmentation technology can support an intelligent terminal such as a mobile phone or a tablet computer in displaying information to a user based on a key character selected by the user on a screen of the intelligent terminal. For example, the mobile phone may obtain an image based on a screenshot operation triggered by the user, and identify a key character in the image in a text recognition process. Then, the mobile phone may obtain, from a network, information associated with the key character, and display the information to the user.

However, because a meaning of a Chinese word may be ambiguous, the intelligent terminal may display, to the user, information that the user is not interested in. For example, if the key character is a person name, the intelligent terminal may display, to the user, information that is about a person with a same surname and that the user is not interested in. For another example, if the key character is a polysemantic word, the intelligent terminal may display, to the user, association information of a word meaning that is in a plurality of word meanings and that the user is not interested in.

In conclusion, a display result is not accurate enough when information is displayed to the user based on a key character selected by the user.

SUMMARY

Illustrative examples of this application provide an information display method and an apparatus, to resolve a technical problem that a display result is not accurate enough when information is displayed to a user based on a key character selected by the user.

According to a first aspect, an information display method is provided. The terminal obtains a first operation entered by a user, obtains at least one key character based on the first operation, further determines that characteristic information associated with the key character is stored, and displays target information associated with the characteristic information, where the target information is information that is in a set of information associated with the key character and that is associated with the characteristic information.

In the foregoing manner, when an electronic device 100 stores the characteristic information related to the key character, when the electronic device 100 displays, to the user, the information associated with the key character, if the electronic device 100 can display the target information associated with the characteristic information, the user is more interested in the displayed information. Therefore, the method can improve information display precision.

In a possible design, the characteristic information may include a part or all of the following information: a method of contact associated with the key character, a communication record associated with the key character, a search record associated with the key character, any one or more pieces of user preference information in a user preference information set, or application scenario information of the terminal. The user preference information is used to indicate content that the user is interested in, and the application scenario information is related to a current application scenario of the terminal.

In a possible design, if the terminal stores a method of contact associated with the key character, the terminal may display the method of contact when displaying the target information.

In a possible design, if the terminal stores a communication record associated with the key character, the terminal may display a method of contact associated with the communication record when displaying the target information.

Further, when the target information is the method of contact, if the method of contact includes a phone number, the terminal may further display first information, where the first information is used to query the user whether to dial the phone number; if the method of contact includes an email address, the terminal may further display second information, where the second information is used to query the user whether to send an email to the email address; and if the method of contact includes an SMS message number, the terminal may further display third information, where the third information is used to query the user whether to send an SMS message to the SMS message number. In the foregoing manner, when the terminal displays the method of contact, the terminal may further query the user whether to contact by using the method of contact.

In a possible design, if the characteristic information includes a search record associated with the key character, when displaying the target information, the terminal may display the search record, and/or display an index of content that is in the search record and that is browsed by the user.

In a possible design, if the characteristic information includes any one or more pieces of user preference information in a user preference information set, when displaying the target information, the terminal may display information that is in a set of information associated with the key character and that is associated with the any one or more pieces of user preference information.

In a possible design, if the characteristic information includes application scenario information of the terminal, when displaying the target information, the terminal may display information that is in the set of information associated with the key character and that is associated with the application scenario information.

According to a second aspect, a terminal is provided, including a memory, a processor, and a display screen. The memory is configured to store computer-executable program code; the processor is configured to invoke the computer-executable program code to perform the following steps: obtaining a first operation entered by a user; determining at least one key character based on the first operation; and determining that characteristic information associated with the key character is stored; and the display screen is configured to display target information, where the target information is information that is in a set of information associated with the key character and that is associated with the characteristic information.

In a possible design, the characteristic information may include a part or all of the following information: a method of contact associated with the key character, a communication record associated with the key character, a search record associated with the key character, any one or more pieces of user preference information in a user preference information set, or application scenario information of the terminal. The user preference information is used to indicate content that the user is interested in, and the application scenario information is related to a current application scenario of the terminal.

In a possible design, if the terminal stores a method of contact associated with the key character, the display screen may be configured to display the method of contact.

In a possible design, if the terminal stores a communication record associated with the key character, the display screen may be configured to display a method of contact associated with the communication record.

In a possible design, when the target information is the method of contact, if the method of contact includes a phone number, the display screen may further display first information, where the first information is used to query the user whether to dial the phone number; if the method of contact includes an email address, the display screen may further display second information, where the second information is used to query the user whether to send an email to the email address; and if the method of contact includes an SMS message number, the display screen may further display third information, where the third information is used to query the user whether to send an SMS message to the SMS message number. In the foregoing manner, when the terminal displays the method of contact, the terminal may further query the user whether to contact by using the method of contact.

In a possible design, if the characteristic information includes a search record associated with the key character, the display screen may be further configured to display the search record, and/or display an index of content that is in the search record and that is browsed by the user.

In a possible design, if the characteristic information includes any one or more pieces of user preference information in a user preference information set, the display screen may be configured to display information that is in a set of information associated with the key character and that is associated with the any one or more pieces of user preference information.

In a possible design, if the characteristic information includes application scenario information of the terminal, the display screen may be configured to display information that is in the set of information associated with the key character and that is associated with the application scenario information.

According to a third aspect, an embodiment of this application provides a terminal, configured to implement the first aspect or any method in the first aspect, and including corresponding functional modules, separately configured to implement steps in the foregoing method. A function may be implemented by hardware, or may be implemented by hardware by executing corresponding software. The hardware or software includes one or more modules corresponding to the function.

According to a fourth aspect, an illustrative example of this application provides a computer-readable storage medium, including computer-executable program code. When the computer-executable program code is used on a computer, the computer is enabled to perform the method according to any one of the first aspect or the possible implementations of the first aspect.

According to a fifth aspect, an illustrative example of this application provides a computer program product. When the computer program product runs on a computer, the computer is enabled to perform the method according to any one of the first aspect or the possible implementations of the first aspect.

According to a sixth aspect, an illustrative example of this application provides a chip. The chip may be coupled to a memory, and may be configured to execute computer-executable program code in the memory, to perform the method according to any one of the first aspect or the possible designs of the first aspect in the illustrative examples of this application. "Coupling" means that two components are directly or indirectly combined with each other. For example, "coupling" may mean that the two components are electrically connected.

For technical effects brought by the second aspect to the sixth aspect, refer to the description of the first aspect. Details are not described herein again.

BRIEF DESCRIPTION OF DRAWINGS

FIG. 2B-1 and FIG. 2B-2 are a schematic diagram of a word segmentation interface in a terminal according to an illustrative example of this application;

DETAILED DESCRIPTION OF DRAWINGS

It should be understood that, in the illustrative examples of this application, "at least one" means one or more, and "a plurality of" means two or more. The term "and/or" describes an association relationship between associated objects and represents that three relationships may exist. For example, A and/or B may represent the following cases: Only A exists, both A and B exist, and only B exists, where A and B may be singular or plural. The character "/" usually indicates an "or" relationship between associated objects. "At least one of the following" or a similar expression thereof indicates any combination of the following, and includes any combination of one or more of the following.

For example, at least one of a, b, or c may indicate a, b, c, a and b, a and c, b and c, or a, b, and c, where a, b, and c may be singular or plural.

The illustrative examples disclosed in this application may be applied to an electronic device. In some illustrative examples of this application, the electronic device may be a portable electronic device, such as a mobile phone, a tablet computer, a wearable device (e.g., a smartwatch), or a vehicle-mounted device with a wireless communication function, that includes a function such as a personal digital assistant and/or a music player. An illustrative example of the portable electronic device includes but is not limited to a portable electronic device using iOS®, Android®, Microsoft®, or another operating system. The portable electronic device may alternatively be, for example, a laptop having a touch-sensitive surface (e.g., a touch panel). It should be further understood that, in some other illustrative examples of this application, the electronic device may alternatively be a desktop computer with a touch-sensitive surface (e.g., a touch panel).

Figure 1:
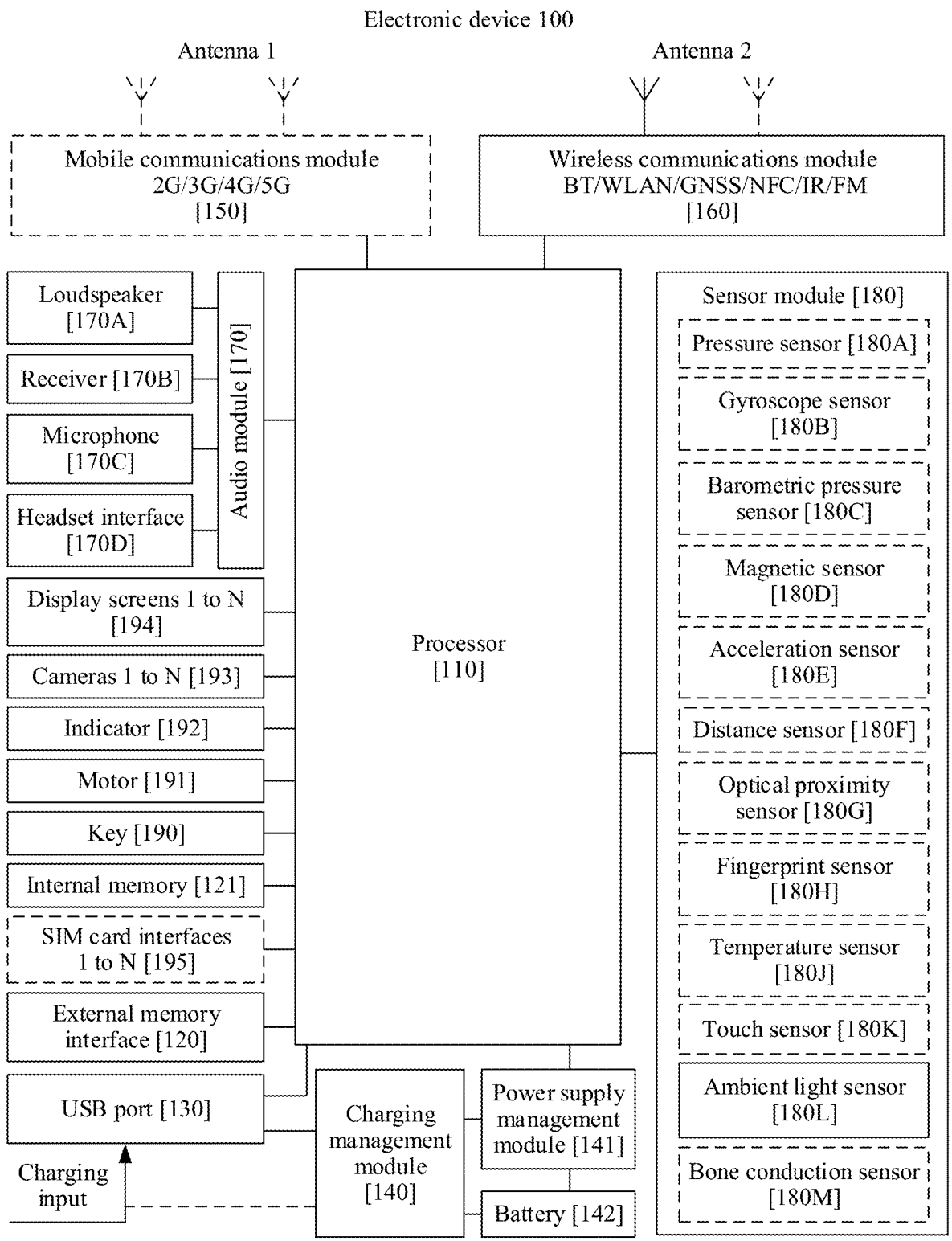
FIG. 1 is a schematic structural diagram of a terminal to which an illustrative example of this application is applicable.

FIG. 1 is a schematic structural diagram of an electronic device 100.

The electronic device 100 may include a processor 110, an external memory interface 120, an internal memory 121, and a universal serial bus (USB) interface 130, a charging management module 140, a power supply management module 141, a battery 142, an antenna 2, a wireless communications module 160, an audio module 170, a loudspeaker 170A, a receiver 170B, a microphone 170C, a headset interface 170D, a sensor module 180, a key 190, a motor 191, an indicator 192, a camera 193, a display screen 194, and the like. The sensor module 180 includes an ambient optical sensor 180L. In addition, the sensor module 180 may further include a pressure sensor 180A, a gyroscope sensor 180B, a barometric pressure sensor 180C, a magnetic sensor 180D, an acceleration sensor 180E, a distance sensor 180F, an optical proximity sensor 180G, a fingerprint sensor 180H, a temperature sensor 180J, a touch sensor 180K, and a bone conduction sensor 180M, and the like. In some other illustrative examples, the electronic device 100 in the illustrative examples of this application may further include an antenna 1, a mobile communications module 150, a subscriber identification module (SIM) card interface 195, and the like.

The processor 110 may include one or more processing units. For example, the processor 110 may include an application processor (AP), a modem processor, a graphics processing unit (GPU), an image signal processor (ISP), a controller, a memory, a video codec, and a digital signal processor (DSP), a baseband processor, a neural-network processor (neural-network processing unit, NPU), and/or the like. Different processing units may be independent components, or may be integrated into one or more processors.

In some illustrative examples, a memory may be further disposed in the processor 110, and is configured to store an instruction and data. For example, the memory in the processor 110 may be a cache memory. The memory may store an instruction or data just used or cyclically used by the processor 110. If the processor 110 needs to use the instruction or the data again, the processor 110 may directly invoke the instruction or the data from the memory. This avoids repeated access and reduces waiting time of the processor 110, to improve system efficiency.

In some other illustrative examples, the processor 110 may alternatively include one or more interfaces. For example, the interface may be a universal serial bus (USB) interface 130. For another example, the interface may further be an inter-integrated circuit (I2C) interface, an inter-integrated circuit sound (I2S) interface, a pulse code modulation (PCM) interface, a universal asynchronous receiver/transmitter (UART) interface, a mobile industry processor interface (MIPI), a general-purpose input/output (GPIO) interface, a subscriber identity module (SIM) interface, or the like. It may be understood that in the illustrative examples of this application, different modules of the electronic device 100 may be connected through the interface, so that the electronic device 100 can implement different functions, for example, photographing and processing. It should be noted that a connection manner of the interface in the electronic device 100 is not limited in the illustrative examples of this application.

The USB interface 130 is an interface that complies with a USB standard specification. For example, the USB interface 130 may include a mini USB interface, a micro USB interface, a USB type C interface, or the like. The USB interface 130 may be configured to connect to a charger to charge the electronic device 100, may be configured to transmit data between the electronic device 100 and a peripheral device, or may be configured to connect to a headset to play audio by using the headset. Alternatively, the interface may be configured to connect to another electronic device such as an AR device.

The charging management module 140 is configured to receive charging input from the charger. The charger may be a wireless charger or a wired charger. In some illustrative examples of wired charging, the charging management module 140 may receive charging input from the wired charger through the USB interface 130. In some illustrative examples of wireless charging, the charging management module 140 may receive a wireless charging input by using a wireless charging coil of the electronic device 100. The charging management module 140 supplies power to the electronic device by using the power supply management module 141 while charging the battery 142.

The power supply management module 141 is configured to connect the battery 142 and the charging management module 140 to the processor 110. The power supply management module 141 receives an input of the battery 142 and/or the charging management module 140, and supplies power for the processor 110, the internal memory 121, an external memory, the display screen 194, the camera 193, the wireless communications module 160, and the like. The power supply management module 141 may further be configured to monitor parameters such as a battery capacity, battery cycles, a battery health status (e.g., electric leakage or impedance). In some other illustrative examples, the power supply management module 141 may alternatively be disposed in the processor 110. In some other illustrative examples, the power supply management module 141 and the charging management module 140 may alternatively be disposed in a same device.

A wireless communication function of the electronic device 100 may be implemented through the antenna 1, the antenna 2, the mobile communications module 150, the wireless communications module 160, the modem processor, the baseband processor, and the like.

The antenna 1 and the antenna 2 are configured to: transmit and receive electromagnetic wave signals. Each antenna in the electronic device 100 may be configured to cover one or more communication frequency bands. Different antennas may be further multiplexed to improve antenna utilization. For example, the antenna 1 may be multiplexed as a diversity antenna in a wireless local area network. In some other illustrative examples, an antenna may be used in combination with a tuning switch.

The mobile communications module 150 may provide a wireless communication solution that includes 2G/3G/4G/5G or the like and that is applied to the electronic device 100. The mobile communications module 150 may include at least one filter, a switch, a power amplifier, a low noise amplifier (LNA), and the like. The mobile communications module 150 may receive an electromagnetic wave through the antenna 1, perform processing such as filtering or amplification on the received electromagnetic wave, and transfer the electromagnetic wave to the modem processor for demodulation. The mobile communications module 150 may further amplify a signal modulated by the modem processor, and convert the signal into an electromagnetic wave for radiation through the antenna 1. In some illustrative examples, at least some functional modules of the mobile communications module 150 may be disposed in the processor 110. In some illustrative examples, at least some functional modules of the mobile communications module 150 and at least some modules of the processor 110 may be disposed in a same device.

The modem processor may include a modulator and a demodulator. The modulator is configured to modulate a to-be-sent low-frequency baseband signal into a medium or high-frequency signal. The demodulator is configured to demodulate a received electromagnetic wave signal into a low-frequency baseband signal. Then, the demodulator transmits the low-frequency baseband signal obtained through demodulation to the baseband processor for processing. The low-frequency baseband signal is processed by the baseband processor, and then transmitted to the application processor. The application processor outputs a sound signal by using an audio device (which is not limited to the loudspeaker 170A, the receiver 170B, or the like), or displays an image or a video by using the display screen 194. In some illustrative examples, the modem processor may be an independent component. In some other illustrative examples, the modem processor may be independent of the processor 110, and is disposed in a same device as the mobile communications module 150 or another functional module.

The wireless communications module 160 may provide a solution for wireless communication such as a wireless local area network (WLAN) (e.g., a wireless fidelity (Wi-Fi) network), Bluetooth (BT), a global navigation satellite system (GNSS), frequency modulation (FM), a near field communication (NFC) technology, or an infrared (IR) technology applied to the electronic device 100. The wireless communications module 160 may be one or more components integrated into at least one communications processing module. The wireless communications module 160 receives an electromagnetic wave signal through the antenna 2, performs frequency modulation and filtering processing on the electromagnetic wave signal, and sends a processed signal to the processor 110. The wireless communications module 160 may further receive a to-be-sent signal from the processor 110, perform frequency modulation and amplification on the signal, and convert the signal into an electromagnetic wave for radiation through the antenna 2.

In some illustrative examples, the antenna 1 of the electronic device 100 is coupled to the mobile communications module 150, and the antenna 2 is coupled to the wireless communications module 160, so that the electronic device 100 may communicate with a network and another device by using a wireless communications technology. The wireless communications technology may include a global system for mobile communications (GSM), a general packet radio service (GPRS), code division multiple access (CDMA), wideband code division multiple access (WCDMA), time-division code division multiple access (TD-SCDMA), long term evolution (LTE), BT, the GNSS, the WLAN, the NFC, the FM, the IR technology, and/or the like. The GNSS may include a global positioning system (GPS), a global navigation satellite system (GLONASS), a BeiDou navigation satellite system (BDS), a quasi-zenith satellite system (QZSS), and/or a satellite based augmentation system (SBAS).

The electronic device 100 implements a display function by using the GPU, the display screen 194, the application processor, and the like. The GPU is a microprocessor for image processing, and connects the display screen 194 to the application processor. The GPU is configured to: perform mathematical and geometric calculation, and render an image. The processor 110 may include one or more GPUs that execute a program instruction to generate or change display information.

The display screen 194 is configured to display an image, a video, and the like. The display screen 194 includes a display panel. The display panel may be a liquid crystal display (LCD), an organic light-emitting diode (OLED), an active-matrix organic light emitting diode (AMOLED), a flexible light-emitting diode (FLED), miniled, microled, micro-oled, a quantum dot light emitting diode (QLED), or the like. In some illustrative examples, the electronic device 100 may include one or N display screens 194, where N is a positive integer greater than 1.

The electronic device 100 can implement a shooting function by using the ISP, the camera 193, the video codec, the GPU, the display screen 194, the application processor, and the like.

The ISP is configured to process data fed back by the camera 193. For example, during photographing, a shutter is pressed, and light is transmitted to a photosensitive element of the camera through a lens. An optical signal is converted into an electrical signal, and the photosensitive element of the camera transmits the electrical signal to the ISP for processing, to convert the electrical signal into a visible image. The ISP may further perform algorithm optimization on noise, luminance, and complexion of the image. The ISP may further optimize parameters such as exposure and a color temperature of a shooting scenario. In some illustrative examples, the ISP may be disposed in the camera 193.

The camera 193 is configured to capture a static image or a video. An optical image of an object is generated through the lens, and is projected onto the photosensitive element. The photosensitive element may be a charge coupled device (CCD) or a complementary metal-oxide-semiconductor (CMOS) phototransistor. The photosensitive element converts an optical signal into an electrical signal, and then transmits the electrical signal to the ISP to convert the electrical signal into a digital image signal. The ISP outputs the digital image signal to the DSP for processing. The DSP converts the digital image signal into a standard image signal in an RGB format, a YUV format, or the like. In some illustrative examples, the electronic device 100 may include one or N cameras 193, where N is a positive integer greater than 1.

The digital signal processor is configured to process a digital signal, and may process another digital signal in addition to the digital image signal. For example, when the electronic device 100 selects a frequency, the digital signal processor is configured to perform Fourier transformation and the like on frequency energy.

The video codec is configured to: compress or decompress a digital video. The electronic device 100 may support one or more types of video codecs. In this way, the electronic device 100 can play or record videos in a plurality of encoding formats, for example, moving picture experts group (MPEG)1, MPEG2, MPEG3, and MPEG4.

The NPU is a neural-network (NN) computing processor, quickly processes input information by referring to a structure of a biological neural network, for example, by referring to a transfer mode between human brain neurons, and may further continuously perform self-learning. Applications such as intelligent cognition of the electronic device 100, such as image recognition, facial recognition, speech recognition, and text understanding, can be implemented by using the NPU.

The external memory interface 120 may be configured to connect to an external storage card (such as a Micro SD card), to extend a storage capability of the electronic device 100. The external storage card communicates with the processor 110 over the external memory interface 120, to implement a data storage function, for example, to store files such as music and a video in the external storage card.

The internal memory 121 may be configured to store computer-executable program code. The executable program code includes an instruction. The processor 110 runs the instruction stored in the internal memory 121 to perform various function applications of the electronic device 100 and process data. The internal memory 121 may include a program storage area and a data storage area. The program storage area may store an operating system, an application required by at least one function (e.g., a sound play function and an image play function), and the like. The data storage area may store data (such as audio data and an address book) created during use of the electronic device 100, and the like. In addition, the internal memory 121 may include a high-speed random access memory, or may include a nonvolatile memory, for example, at least one magnetic disk storage device, a flash memory device, or a universal flash storage (UFS).

The electronic device 100 may implement audio functions, for example, music playing and recording, by using the audio module 170, the speaker 170A, the receiver 170B, the microphone 170C, the headset interface 170D, the application processor, and the like.

The audio module 170 is configured to convert digital audio information into an analog audio signal for output, and is also configured to convert analog audio input into a digital audio signal. The audio module 170 may be further configured to: code and decode an audio signal. In some illustrative examples, the audio module 170 may be disposed in the processor 110, or some functional modules of the audio module 170 are disposed in the processor 110.

The speaker 170A, also referred to as a "horn", is configured to convert an audio electrical signal into a sound signal. The electronic device 100 may be configured to listen to music or answer a call in a hands-free mode over the loudspeaker 170A.

The receiver 170B, also referred to as an "earpiece", is configured to convert an audio electrical signal into a sound signal. When a call is answered or voice information is received by using the electronic device 100, the receiver 170B may be put close to a human ear to receive a voice.

The microphone 170C, also referred to as a "mike" or a "microphone", is configured to convert a sound signal into an electrical signal. When making a call or sending voice information, a user may make a sound by moving a human mouth close to the microphone 170C to input a sound signal to the microphone 170C. At least one microphone 170C may be disposed in the electronic device 100. In some other illustrative examples, two microphones 170C may be disposed in the electronic device 100, to implement a noise reduction function, in addition to collecting an audio signal. In some other illustrative examples, alternatively, three, four, or more microphones 170C may be disposed in the electronic device 100, to collect a sound signal, reduce noise, and further identify a sound source, implement a directional recording function, and the like.

The headset interface 170D is configured to connect to a wired headset. The headset interface 170D may be a USB interface 130, or may be a 3.5 mm open mobile terminal platform (OMTP) standard interface or a cellular telecommunications industry association of the USA (CTIA) standard interface.

The pressure sensor 180A is configured to sense a pressure signal, and can convert the pressure signal into an electrical signal. In some illustrative examples, the pressure sensor 180A may be disposed on the display screen 194. There are a plurality of types of pressure sensors 180A, for example, a resistive pressure sensor, an inductive pressure sensor, a capacitive pressure sensor. The capacitive pressure sensor may include at least two parallel plates made of conductive materials. When a force is applied to the pressure sensor 180A, capacitance between electrodes changes. The electronic device 100 determines pressure intensity based on a change of the capacitance. When a touch operation is performed on the display screen 194, the electronic device 100 detects intensity of the touch operation by using the pressure sensor 180A. The electronic device 100 may also calculate a touch location based on a detection signal of the pressure sensor 180A. In some illustrative examples, touch operations that are performed at a same touch location but have different touch operation intensity may correspond to different operation instructions. For example, when a touch operation whose touch operation strength is less than a first pressure threshold is performed on an icon of an SMS application (which may also be referred to as an SMS message), an instruction for viewing an SMS message is executed. When a touch operation whose touch operation intensity is greater than or equal to the first pressure threshold is performed on the icon of the SMS application, an instruction for creating a new SMS message is executed.

The gyro sensor 180B may be configured to determine a motion posture of the electronic device 100. In some illustrative examples, an angular velocity of the electronic device 100 around three axes (namely, axes x, y, and z) may be determined by using the gyro sensor 180B. The gyro sensor 180B may be configured to perform image stabilization during shooting. For example, when the shutter is pressed, the gyro sensor 180B detects an angle at which the electronic device 100 shakes, and calculates, based on the angle, a distance for which a lens module needs to compensate, so that the lens cancels the shake of the electronic device 100 through reverse motion, to implement image stabilization. The gyro sensor 180B may be further used in navigation and motion sensing game scenarios.

The barometric pressure sensor 180C is configured to measure barometric pressure. In some illustrative examples, the electronic device 100 calculates an altitude based on a barometric pressure value measured by the barometric pressure sensor 180C, to assist in positioning and navigation.

The magnetic sensor 180D includes a Hall sensor. The electronic device 100 may detect opening and closing of a flip leather case by using the magnetic sensor 180D. In some illustrative examples, when the electronic device 100 is a clamshell phone, the electronic device 100 may detect opening and closing of a flip cover by using the magnetic sensor 180D. Further, a feature such as automatic unlocking of the flip cover is set based on a detected opening/closing state of the leather case or a detected opening/closing state of the flip cover.

The acceleration sensor 180E may detect magnitude of accelerations in various directions (usually on three axes) of the electronic device 100, and may detect magnitude and a direction of the gravity when the electronic device 100 is still. The acceleration sensor 180E may be further configured to identify a posture of the electronic device, and is applied to an application such as switching between landscape mode and portrait mode or a pedometer.

The distance sensor 180F is configured to measure a distance. The electronic device 100 may measure the distance in an infrared or a laser manner. In some illustrative examples, in a shooting scenario, the electronic device 100 may measure a distance by using the distance sensor 180F, to implement quick focusing.

For example, the optical proximity sensor 180G may include a light-emitting diode (LED) and an optical detector, for example, a photodiode. The light-emitting diode may be an infrared light-emitting diode. The electronic device 100 emits infrared light by using the light emitting diode. The electronic device 100 detects infrared reflected light from a nearby object by using the photodiode. When sufficient reflected light is detected, it may be determined that there is an object near the electronic device 100. When insufficient reflected light is detected, the electronic device 100 may determine that there is no object near the electronic device 100. The electronic device 100 may detect, by using the optical proximity sensor 180G, that the user holds the electronic device 100 close to an ear for a call, to automatically turn off a screen for power saving. The optical proximity sensor 180G may also be used in a leather case mode or a pocket mode to automatically unlock or lock the screen.

The ambient light sensor 180L is configured to sense ambient light brightness. The electronic device 100 may adaptively adjust brightness of the display screen 194 based on the sensed ambient light brightness. The ambient light sensor 180L may also be configured to automatically adjust white balance during photographing. The ambient light sensor 180L may also cooperate with the optical proximity sensor 180G to detect whether the electronic device 100 is in a pocket, to avoid an accidental touch.

The fingerprint sensor 180H is configured to collect a fingerprint. The electronic device 100 may use a feature of the collected fingerprint to implement fingerprint-based unlocking, application lock access, fingerprint-based photographing, fingerprint-based call answering, and the like.

The temperature sensor 180J is configured to detect a temperature. In some illustrative examples, the electronic device 100 executes a temperature processing policy based on the temperature detected by the temperature sensor 180J. For example, when the temperature reported by the temperature sensor 180J exceeds a threshold, the electronic device 100 degrades performance of a processor near the temperature sensor 180J, to reduce power consumption and implement thermal protection. In some other illustrative examples, when the temperature is lower than another threshold, the electronic device 100 heats up the battery 142, to avoid abnormal shutdown of the electronic device 100 due to a low temperature. In some other illustrative examples, when the temperature is lower than still another threshold, the electronic device 100 boosts an output voltage of the battery 142 to avoid abnormal shutdown due to a low temperature.

The touch sensor 180K is also referred to as a "touch panel". The touch sensor 180K may be disposed on the display screen 194, and the touch sensor 180K and the display screen 194 form a touchscreen, which is also referred to as a "touchscreen". The touch sensor 180K is configured to detect a touch operation performed on or near the touch sensor 180K. The touch sensor may transfer the detected touch operation to the application processor, to determine a type of a touch event. Visual output related to the touch operation may be provided by using the display screen 194. In some other illustrative examples, the touch sensor 180K may also be disposed on a surface of the electronic device 100 at a location different from that of the display screen 194.

The bone conduction sensor 180M may obtain a vibration signal. In some illustrative examples, the bone conduction sensor 180M may obtain a vibration signal of a vibration bone of a human vocal part. The bone conduction sensor 180M may also be in contact with a human pulse, and receive a blood pressure beating signal. In some illustrative examples, the bone conduction sensor 180M may alternatively be disposed in the headset to form a bone conduction headset. The audio module 170 may obtain a voice signal through parsing based on the vibration signal that is of the vibration bone of the vocal part and that is obtained by the bone conduction sensor 180M, to implement a voice function. The application processor may parse heart rate information based on the blood pressure beating signal obtained by the bone conduction sensor 180M, to implement a heart rate detection function.

The key 190 may include a power key, a volume key, and the like. The key 190 may be a mechanical key, or may be a touch key. The electronic device 100 may receive a key input, and generate a key signal input related to a user setting and function control of the electronic device 100.

The motor 191 may generate a vibration prompt. The motor 191 may be configured to produce an incoming call vibration prompt and a touch vibration feedback. For example, touch operations performed on different applications (e.g., photographing and audio playing) may correspond to different vibration feedback effects. The motor 191 may also correspond to different vibration feedback effects for touch operations performed on different areas of the display screen 194. Different application scenarios (e.g., a time reminder, information receiving, an alarm clock, and a game) may also correspond to different vibration feedback effects. A touch vibration feedback effect may be further customized.

The indicator 192 may be an indicator light that may be configured to indicate a charging state and a battery power change, and may further be configured to indicate a message, a missed call, a notification, and the like.

The SIM card interface 195 is configured to connect to a SIM card. The SIM card may be inserted in the SIM card interface 195 or removed from the SIM card interface 195, to implement contact with or separation from the electronic device 100. The electronic device 100 may support one or N SIM card interfaces, where N is a positive integer greater than 1. The SIM card interface 195 may support a nano SIM card, a micro SIM card, a SIM card, and the like. A plurality of cards may be simultaneously inserted into a same SIM card interface 195. The plurality of cards may be of a same type or of different types. The SIM card interface 195 may also be compatible with different types of SIM cards. The SIM card interface 195 may also be compatible with an external storage card. The electronic device 100 interacts with a network through the SIM card, to implement functions such as calling and data communication. In some illustrative examples, the electronic device 100 uses an eSIM, namely, an embedded SIM card. The eSIM card may be embedded in the electronic device 100, and cannot be separated from the electronic device 100.

It may be understood that an example structure in this illustrative example of this application does not constitute a specific limitation on the electronic device 100. In some other illustrative examples of this application, the electronic device 100 may include more or fewer components than those shown in the figure, or some components may be combined, or some components may be split, or there may be a different component layout. The components in the figure may be implemented by using hardware, software, or a combination of software and hardware.

The following uses the electronic device 100 as an example to describe in detail an information display method provided in this illustrative example of this application.

According to the information display method provided in this illustrative example of this application, the electronic device 100 may display information related to a key character to a user. Specifically, the electronic device 100 may determine, based on a key character selected by the user on the electronic device 100, information to be displayed to the user.

Figure 2A:
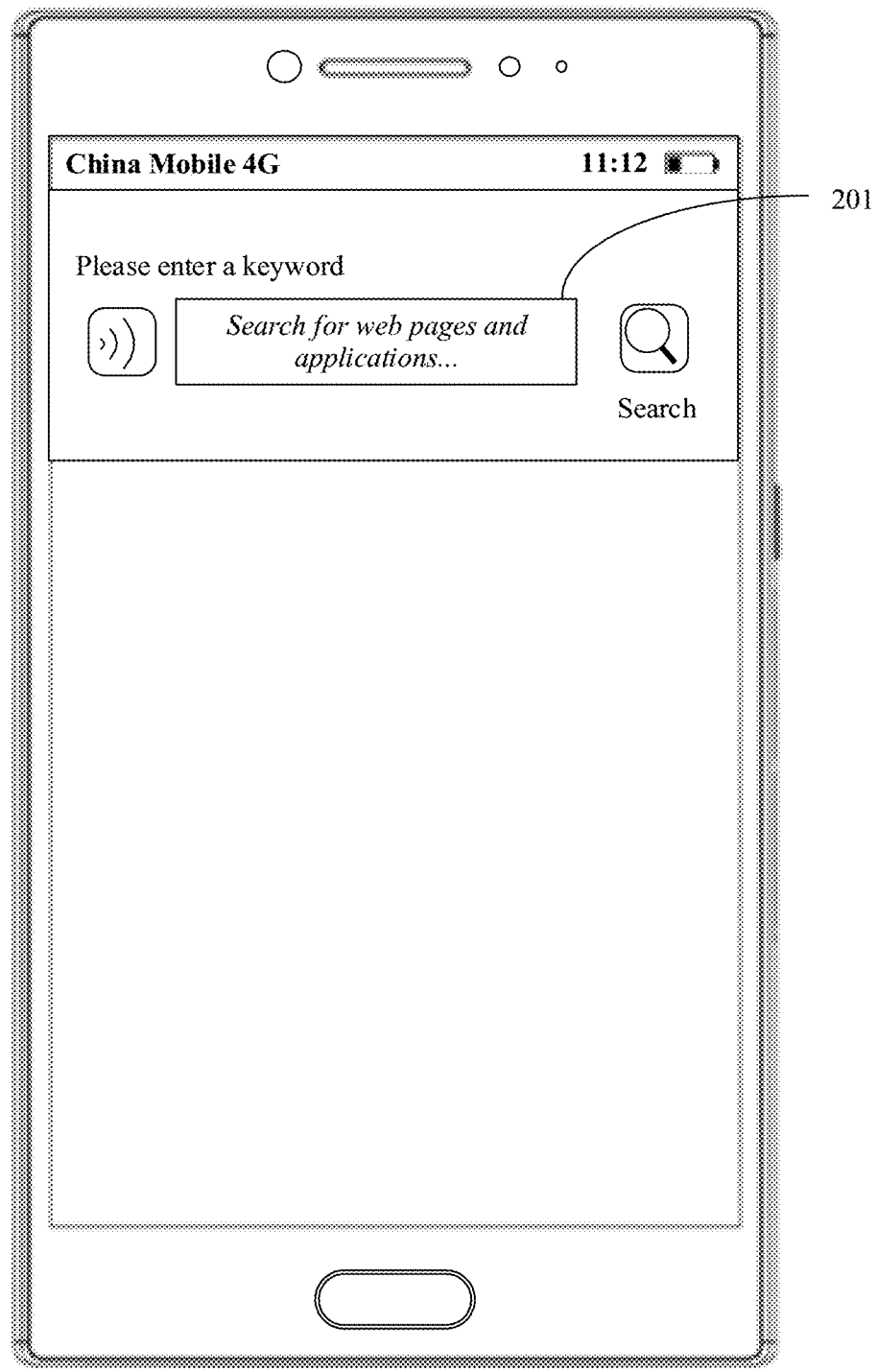
FIG. 2A is a schematic diagram of a key character entering interface in a terminal according to an illustrative example of this application.

In some possible implementations, the electronic device 100 may use a text entered by the user as the key character. For example, the user may manually enter a text on a touchscreen of the electronic device 100 by using an input method of the electronic device 100, and the electronic device 100 may use the text manually entered by the user as the key character. Alternatively, the user may enter a text in a voice manner by using the microphone 170C of the electronic device 100, so that the electronic device 100 may obtain the key character entered by the user by using voice. In implementation, as shown in FIG. 2A, the user may select, on the touchscreen, a key character obtaining box 201 displayed by the electronic device 100, and enter the key character in the key character obtaining box 201 in a manual input manner or a voice input manner. The key character obtaining box 201 herein may be an information box (or referred to as a card) that is displayed by the electronic device 100 and that is used to obtain the key character. The electronic device 100 may use a text entered by the user in the key character obtaining box 201 as the key character, and determine, based on the key character, information that needs to be displayed to the user. The key character obtaining box 201 may include a virtual key for switching an input manner, to switch between the manual input manner and the voice input manner.

In another possible implementation, the user may perform a screenshot operation to enable the electronic device 100 to capture an image currently displayed on the display screen 194, and then the electronic device 100 identifies, by using OCR, texts in the image currently displayed on the display screen 194, and uses some or all of the texts as the key character. The texts recognized by the electronic device 100 may be one or more segments of texts, and a quantity of characters is relatively large. After recognizing the texts, the electronic device 100 may further perform word segmentation processing on the texts by using the processor 110, and extract words in the texts as the key character.

Figures 1, 2B:
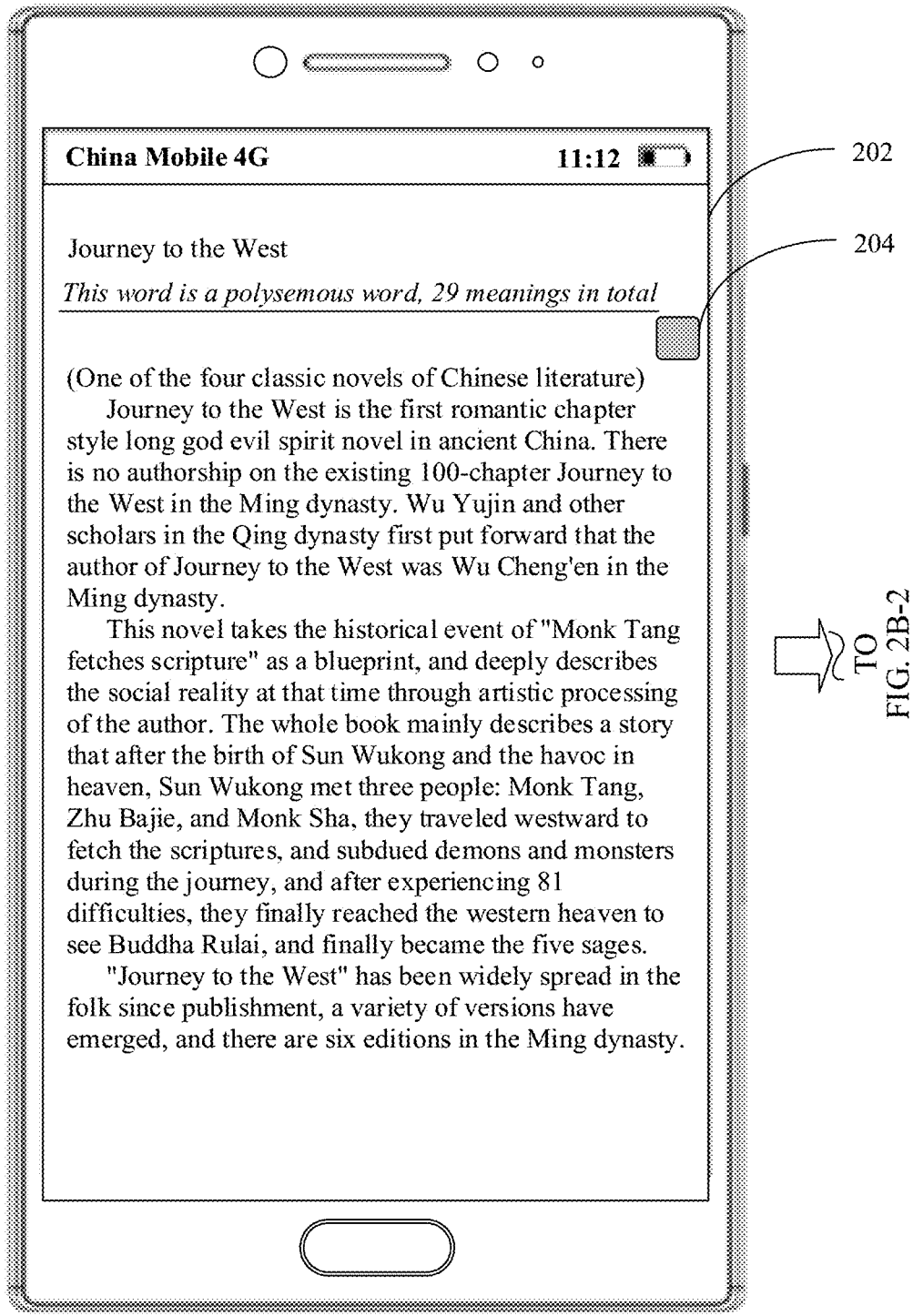
Figures 2, 2B:
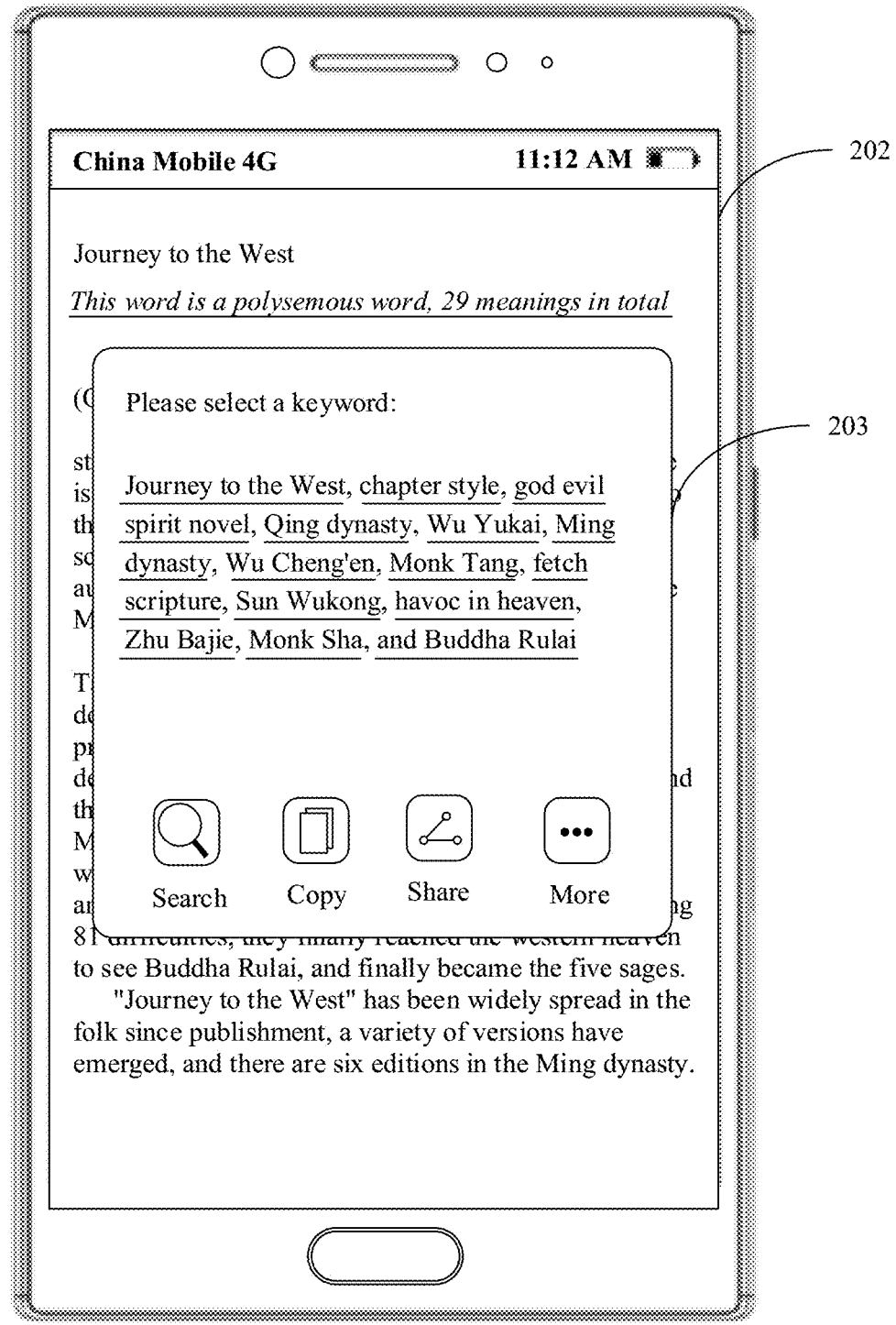

For example, the electronic device 100 may perform the screenshot operation of the user, for example, capture a user interface 202 shown in FIG. 2B-1 and FIG. 2B-2. It can be learned that the user interface 202 displays a related text introduction of "Journey to the West", and the electronic device 100 may recognize, based on the OCR, texts displayed on the user interface 202, and then perform word segmentation on the recognized texts, to obtain word segmentations such as "Journey to the West" and "chapter style" shown in a word segmentation interface 203, and the electronic device 100 may use some or all of the word segmentations as the key character, to determine information to be displayed to the user.

Specifically, the electronic device 100 may prompt, by using a text, the user to select the key character from a word segmentation result, and then may select, based on an operation that the user may perform on a word segmentation location on the touchscreen, the key character from all the word segmentations displayed on the word segmentation interface 203.

The word segmentation interface 203 may further include a virtual key, for example, including a virtual key indicating search, copy, share, or more options. The user may choose to trigger, by using the virtual key, a search, copy, share, or another operation on the word segmentations shown in the word segmentation interface 203, and the user may further search another application program (APP) for a word segmentation, for example, locate, in a map application program, a geographical location indicated by the word segmentation.

In the foregoing example, the screenshot operation may be that the electronic device 100 detects that the user triggers a preset screenshot gesture on the touchscreen. The screenshot gesture may be a single-finger touch and hold operation, a multi-finger (e.g., two fingers) touch and hold operation, a single-finger slide operation, a multi-finger slide operation, or the like performed by the user on the display screen. It should be understood that the touch and hold operation herein means that the user presses a location or a plurality of locations on the touchscreen for a preset duration (e.g., 1 second), and the slide operation means that the user performs continuous drag and touch on the touchscreen, where a start point of the slide operation performed by the user on the touchscreen may be the same as or different from an end point of the slide operation.

Figure 2C:
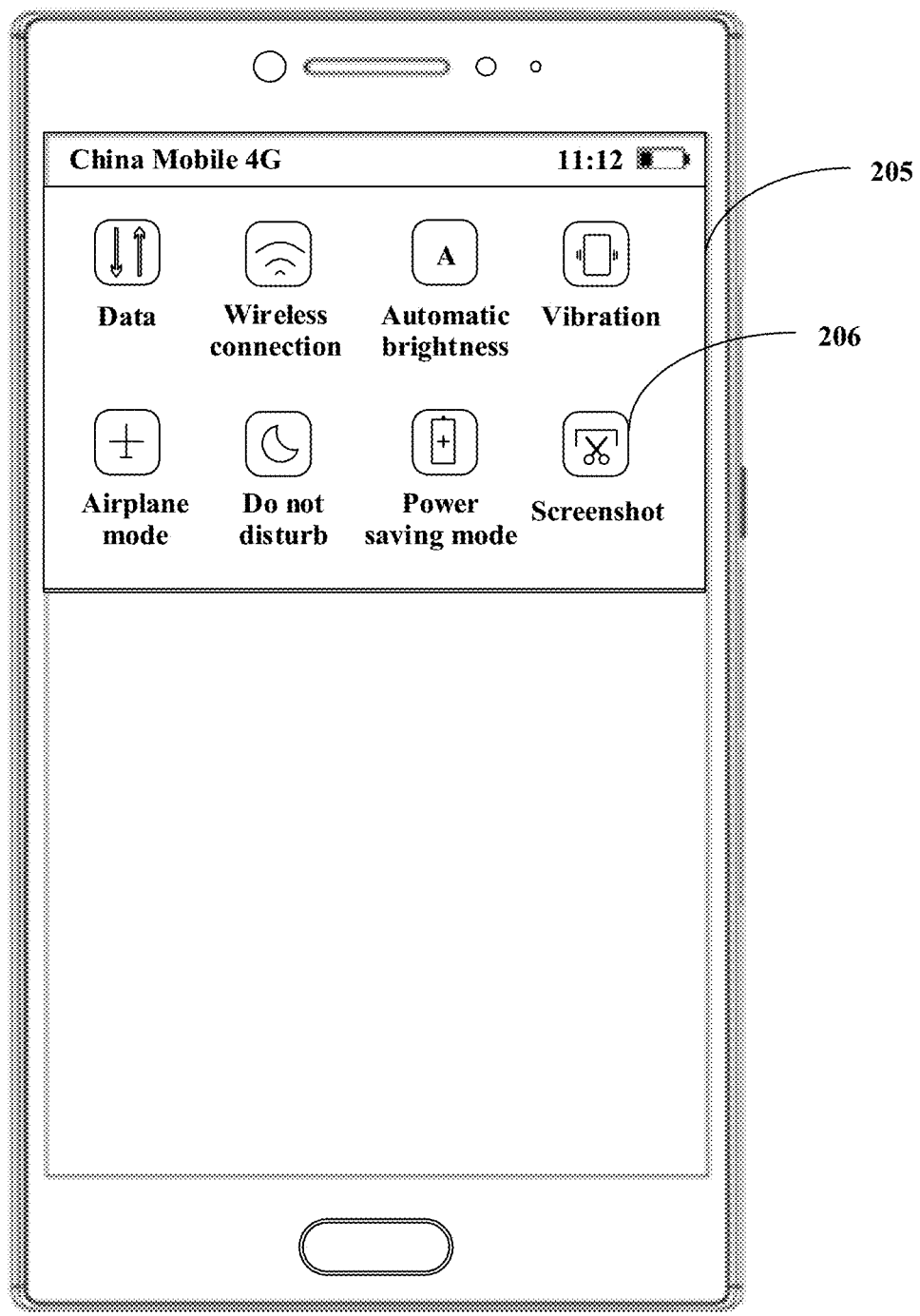
FIG. 2C is a schematic diagram of a status bar of a terminal according to an illustrative example of this application.

In addition, the screenshot operation may be a trigger operation (e.g., tapping or touching and holding) performed by the user on a screenshot button 204 displayed on the user interface 202. The screenshot button 204 herein may be a floating key displayed on the user interface 202 by the display screen 194. Alternatively, the screenshot operation may be a trigger operation performed by the user on a screenshot key 206 in a status bar 205 of a mobile phone shown in FIG. 2C, for example, tapping the screenshot key 206 or touching and holding the screenshot key 206. The status bar 205 may be triggered after the user slides down from a topmost direction of the display screen of the electronic device 100. The status bar 205 may include state switches of the mobile phone such as "data", "wireless connection", "automatic brightness", and "vibration", and the user may control, by triggering a state switch, the electronic device 100 to enter or exit a corresponding state of the state switch. The status bar 205 may also include a function key such as the screenshot key 206 or a synchronization key (used to control the electronic device 100 to perform data synchronization), so that the user can implement a corresponding function by triggering the function key.

Figure 3:
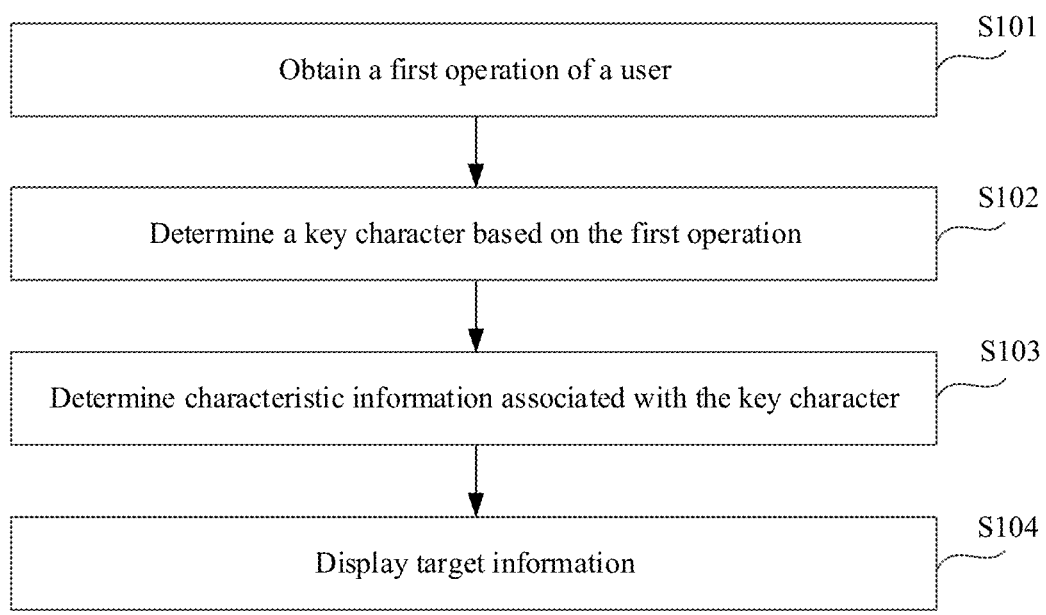
FIG. 3 is a schematic flowchart of an information display method according to an illustrative example of this application.

In the information display method provided in this application, the electronic device 100 may display information according to a method shown in FIG. 3. The method may include the following steps.

S101: The electronic device 100 obtains a first operation entered by a user.

S102: The electronic device 100 determines at least one key character based on the first operation.

S103: The electronic device 100 determines that characteristic information related to the key character is stored.

S104: The electronic device 100 displays target information, where the target information is information that is in a set of information associated with the key character and that is associated with the characteristic information.

It may be understood that, if the electronic device 100 stores the characteristic information related to the key character, when the electronic device 100 displays, to the user, the information associated with the key character, if the electronic device 100 can display the target information associated with the characteristic information, the user is more interested in the displayed information. Therefore, the foregoing method can improve information display precision.

That the user controls the electronic device 100 to obtain a captured key character may be that the user enters the key character to the electronic device 100 through manual input or voice input. In this case, the first operation may be a manual input operation or a voice input operation of the user. Then, the electronic device 100 may use a character entered by the user as the key character. The user may also trigger a screenshot operation, so that the electronic device 100 obtains the captured key character. In this case, the first operation may be a screenshot operation of the user, and then the electronic device 100 performs text recognition on content displayed on the display screen 194, to determine the key character based on the recognized text.

It should be understood that the set of information associated with the key character may include all information that is obtained by the electronic device 100 from a network and that is associated with the key character. For example, the set may include all information that can be obtained by the electronic device 100 by searching the network based on the key character. Specifically, the information associated with the key character may include content associated with the key character. For example, the key character is the key character "Wu Cheng'en" shown in the word segmentation interface 203, and the information associated with the key character may include personal information related to Wu Cheng'en, such as a personal introduction and main works. For another example, the key character is a movie and television noun, and the information associated with the key character may include information about a movie and television work related to the movie and television noun, and a play link of the movie and television work. For example, the key character is "havoc in heaven", and the electronic device 100 may display, to the user, information about a movie and television work, a play link, and the like that are related to "havoc in heaven".

The information associated with the key character may further include information that is locally stored in the electronic device 100 and that is associated with the key character. For example, if the key character is a person name, the information associated with the key character may further include information that is stored in the electronic device 100 and that is about the person, for example, a method of contact associated with the name in an address book.

For another example, the electronic device 100 locally stores a search record of the key character, and the information associated with the key character may further include the search record of the key character on the electronic device 100, a website address of each search result browsed by the user in the search record, and the like. For example, the user searches for "Sun Wukong" on the electronic device 100, and browses picture pages related to "Sun Wukong". The electronic device 100 may store these search records and website addresses of pages, and the information associated with the key character "Sun Wukong" may also include the website addresses of the picture pages that are browsed by the user and that are related to "Sun Wukong".

In this illustrative example of this application, the characteristic information may include at least one piece of information stored in at least one electronic device 100. The following separately describes manners of setting the characteristic information by using examples, and describes how to determine, for different characteristic information, the information that is in the set of information associated with the key character and that is associated with the characteristic information.

Manner 1: The characteristic information may include a method of contact that is stored in the electronic device 100 and that is associated with the key character.

The key character may be a person name, a company name, or another character related to a method of contact, for example, a phone number or an email address. The electronic device 100 may search a local address book for the key character to determine whether a method of contact associated with the key character is stored in the local address book. If the method of contact associated with the key character exists in the local address book, the electronic device 100 may display the method of contact associated with the key character as the target information to the user. When the electronic device 100 stores a method of contact of a person represented by the key character, an intent of the user when the user controls the electronic device 100 to obtain a person name is likely to be to contact, by using the stored method of contact, the person represented by the key character. In this case, the electronic device 100 may display the method of contact related to the person to the user, to improve display accuracy.

In implementation, the electronic device may store an address book shown in Table 1, to determine whether the method of contact associated with the key character is stored. As shown in Table 1, the address book may include information such as a name (a person name or a company name), a phone number (a fixed-line phone number and/or a mobile phone number), an email address (the email address may be obtained from a historical email sending and receiving record stored in the electronic device 100), an SMS message number (which may be the same as or different from the mobile phone number, and the SMS message number may be obtained from a historical SMS message sending and receiving record stored in the electronic device 100), and a fax number. Information in each column in the address book corresponds to each other. When the method of contact corresponding to the key character is queried, information in any column in the address book can be used as the key character, and information in other columns corresponding to the information in any column can be used as the method of contact associated with the key character.

TABLE 1

Address book

| Name | Fixed-line phone number | Mobile phone number | Email address | SMS message number | Fax number |
|---|---|---|---|---|---|
| Zhang San | 11111111 | 13000000000 13000000001 | a@A | 13000000000 | 11111111 |
| Li Si | | | | | |
| Company A | 11111112 | | c@C | | 11111113 |
| ... | ... | ... | ... | ... | ... |

For example, the key character is "Zhang San". According to Table 1, after determining that methods of contact corresponding to "Zhang San" exist in the local address book, the electronic device 100 determines that the electronic device 100 stores the methods of contact associated with the key character, and these methods of contact are the characteristic information. Then, the electronic device 100 may display some or all methods of contact in the fixed-line phone number, the mobile phone number, the email address, the SMS message number, or the fax number of Zhang San, to display the target information.

For another example, if the key character is "13000000000", the electronic device 100 may query the address book shown in Table 1, and determine that "13000000000" is a method of contact of "Zhang San". Then, the electronic device 100 may display Zhang San, and the fixed-line phone number, the email address, and the fax number of Zhang San.

In implementation, if the target information is the method of contact, when displaying the target information, the electronic device 100 may further query the user whether to contact a person (or a company) associated with the method of contact by using the method of contact.

Figure 4:
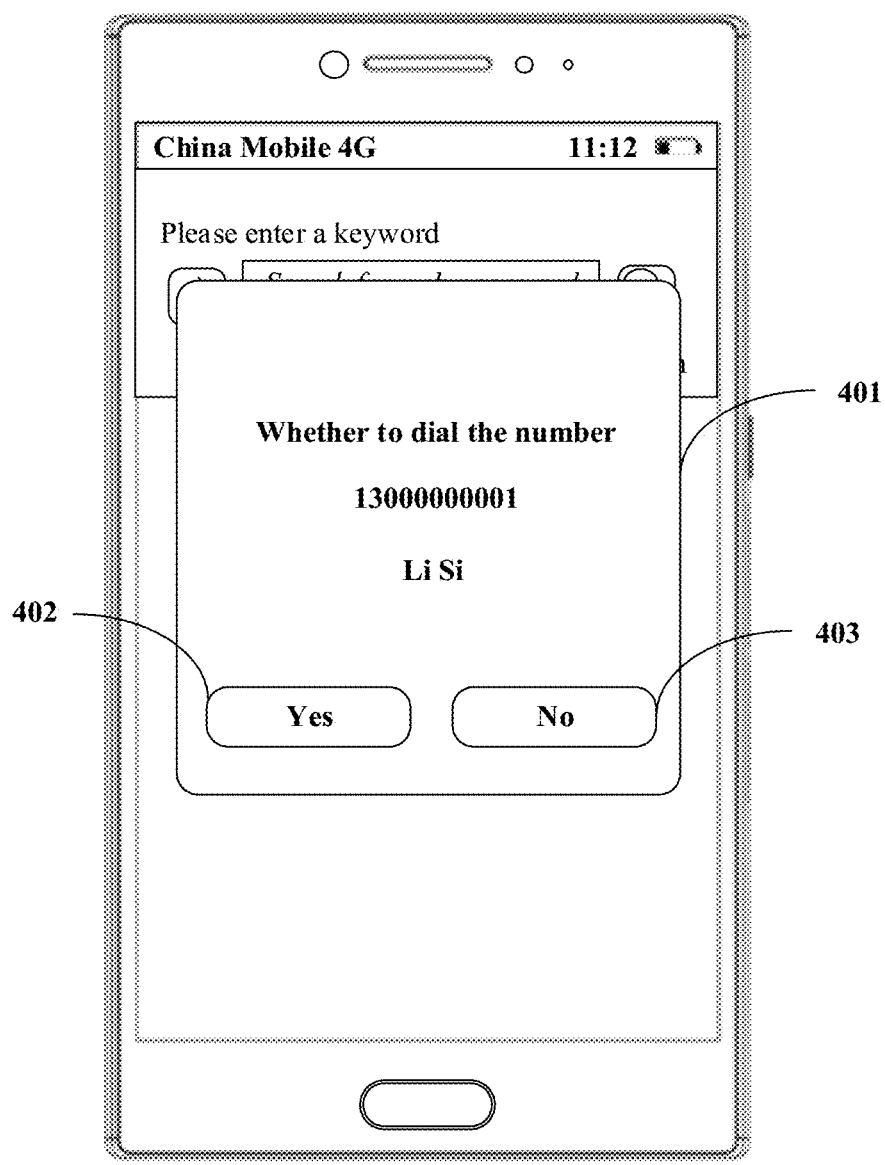
FIG. 4 is a schematic diagram of an interface of displaying an information box according to an illustrative example of this application.

Specifically, if the key character is the name "Li Si", when displaying the mobile phone number of Li Si, the electronic device 100 may further display first information in an information box 401 shown in FIG. 4. The first information may be used to query the user whether to dial the mobile phone number of Li Si. If the user triggers an operation of dialing the mobile phone number, for example, taps a virtual key 402 indicating that the mobile phone number of Li Si is dialed, the electronic device 100 may dial the mobile phone number of Li Si. Otherwise, if the user triggers an operation of abandoning dialing the mobile phone number, for example, taps a virtual key 403 indicating that the mobile phone number of Li Si is not dialed, the electronic device 100 may abandon dialing the mobile phone number of Li Si.

In an implementation, the information box 401 shown in FIG. 4 may be displayed within specified display time. If the user does not trigger the operation of dialing the phone number within the specified display time and does not trigger the operation of abandoning dialing the phone number, the electronic device 100 may consider that the user dials the phone number by default, so as to perform the dialing operation. Alternatively, the electronic device 100 considers that the user abandons dialing the phone number by default, so as to abandon making a call, and no longer displays the information box 401.

In implementation, when the method of contact corresponding to the key character determined by the electronic device 100 includes the email address, the electronic device 100 may further display second information, and the second information is used to query the user whether to send an email to the email address. For a specific implementation, refer to a manner in which the information box 401 shown in FIG. 4 is used to query the user whether to make a call. For brevity, details are not described herein again.

In addition, during implementation, when the method of contact corresponding to the key character determined by the electronic device 100 includes the SMS message number, the electronic device 100 may further display third information, and the third information is used to query the user whether to send an SMS message to the SMS message number. For a specific implementation, refer to a manner in which the information box 401 shown in FIG. 4 is used to query the user whether to make a call. For brevity, details are not described herein again.

Figure 5:
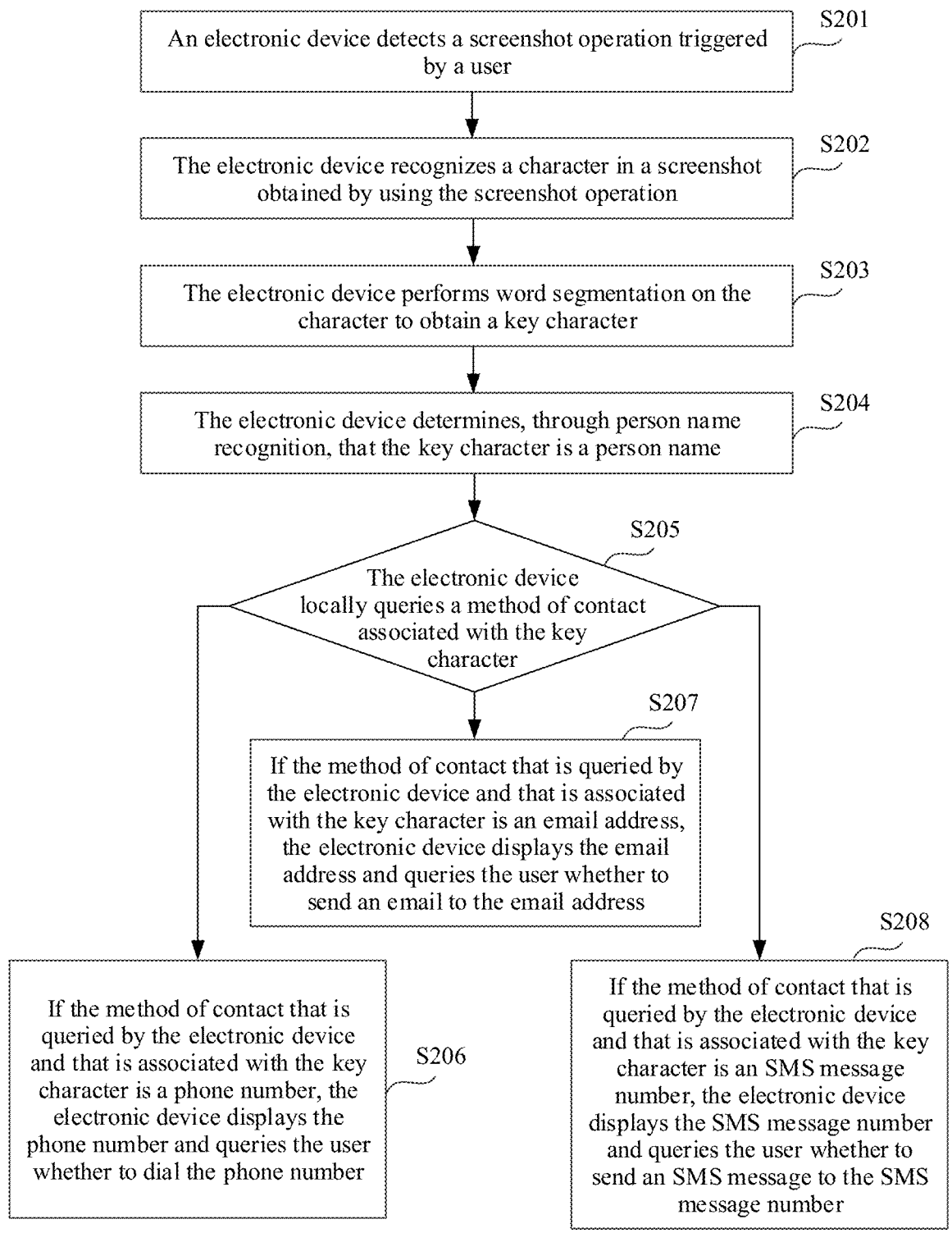
FIG. 5 is a schematic flowchart of another information display method according to an illustrative example of this application.

In a feasible implementation, the electronic device 100 may recognize whether the key character is a person name or a company name. If the key character is the person name or the company name, the electronic device 100 may search, based on the person name, the address book for a method of contact associated with the person name or the company name, and display the method of contact. The electronic device 100 may determine, based on a server or a locally stored database, whether each key character is a person name or a company name. For example, the key character is the person name. As shown in FIG. 5, an information display method provided in this illustrative example of this application may include the following steps.

Step S201: An electronic device 100 detects a screenshot operation triggered by a user.

Step S202: The electronic device 100 recognizes a character in a screenshot obtained by using the screenshot operation.

Step S203: The electronic device 100 performs word segmentation on the character to obtain a key character.

Step S204: The electronic device 100 determines, through person name recognition, that the key character is a person name.

Step S205: The electronic device 100 locally queries a method of contact associated with the key character.

Step S206: If the method of contact that is queried by the electronic device 100 and that is associated with the key character is a phone number, the electronic device 100 displays the phone number and queries the user whether to dial the phone number.

Step S207: If the method of contact that is queried by the electronic device 100 and that is associated with the key character is an email address, the electronic device 100 displays the email address and queries the user whether to send an email to the email address.

Step S208: If the method of contact that is queried by the electronic device 100 and that is associated with the key character is an SMS message number, the electronic device 100 displays the SMS message number and queries the user whether to send an SMS message to the SMS message number.

Definitely, in the illustrative example of the present disclosure, it is alternatively possible to directly match the key character with a person name field in the locally stored database (for example, an address book) without recognizing whether the key character is a person name or a company name, and recommend to the user to display a corresponding phone number and email address based on a matching result.

Manner 2: The characteristic information may include a communication record that is stored in the electronic device 100 and that is associated with the key character.

The electronic device 100 may search a communication record stored in the electronic device 100 for the communication record associated with the key character, and if the communication record associated with the key character exists, the electronic device 100 may display a contact person and a method of contact related to the communication record as the target information. The communication record herein includes but is not limited to a call record, an email sending and receiving record, an SMS message sending and receiving record, and the like.

For example, the electronic device 100 may search for the key character in a communication address (e.g., a phone number of a calling party, a phone number of an outgoing party, an email address of an incoming or outgoing party, or an SMS message number of an incoming or outgoing party) and/or communication content (e.g., email content, SMS message content, WeChat chat content, and the like) in the communication record. If the electronic device 100 can query the key character, the electronic device 100 may use the communication record as the characteristic information, and use a method of contact of the communication record as the target information.

For example, if the key character is "13000000003", and the electronic device 100 stores a call record with "13000000003", the electronic device 100 may display "13000000003" as the target information, and query the user whether to dial the number.

If the key character is "b@B", and the electronic device 100 stores an email sending/receiving record with the email address "b@B", the electronic device 100 may display the email address "b@B" as the target information, and query the user whether to send an email to the email address.

If the key character is "13000000010", and the electronic device 100 stores an SMS message sending and receiving record with the SMS message number "13000000010", the electronic device 100 may display the SMS message number "13000000010" as the target information, and query the user whether to send an SMS message to the SMS message number.

For another example, if the key character is "Li Si", the electronic device 100 may search a stored communication record for a communication record related to "Li Si". If the electronic device 100 determines that "Li Si" is mentioned in an SMS message chat record between the user and "13000000000", the electronic device 100 may display "13000000000" as the target information, and query the user whether to send an SMS message to "13000000000".

Manner 3: The characteristic information is a search record that is stored in the electronic device 100 and that is associated with the key character.

If the key character or a character set including the key character is included in the search record of the electronic device 100, the search record may be used as the characteristic information, and the electronic device 100 may use the search record associated with the key character or the character set as the target information, and display the target information to the user. In implementation, the electronic device 100 may further display, according to the search record, an index of content previously browsed by the user. The index may be a directory, a page number, a website address, a number, or the like of the content browsed by the user, or a combination of some or all of the directory, the page number, the website address, and the number. In this case, the target information is the index of the content previously browsed by the user. Because the user has searched for the key character before, the user is more likely to browse a search result again and browse a page previously searched for. Therefore, the foregoing manner can improve information display accuracy.

For example, the user searches the electronic device 100 for "Sun Wukong", and browses a picture page related to "Sun Wukong". When determining the target information based on the key character "Sun Wukong", the electronic device 100 may display a search result related to "Sun Wukong" and a website address of the picture page browsed by the user as the target information.

Manner 4: The characteristic information is any one or more pieces of user preference information in a user preference information set.

In this illustrative example of this application, the electronic device 100 may determine content that the user is interested in, or determine the user preference information such as a tag and a type of the content that the user is interested in (in other words, the user preference information may be used to indicate the content that the user is interested in), and use the user preference information as the user preference information set. When determining that the information associated with the key character includes information associated with the user preference information, the electronic device 100 may display the information associated with the user preference information to the user as the target information.

For example, the electronic device 100 may analyze a historical operation habit and historical browsing content of the user, and extract the user preference information of the user. For example, the electronic device 100 determines, based on a historical browsing record of the user, that the user watches a variety show program by using the electronic device 100 at fixed time from 8 p.m. to 9 p.m. every Sunday. The user preference information extracted by the electronic device 100 may indicate that the user is interested in all variety show programs, or may be used to indicate that the user is interested in the variety show program, or indicate that the user is interested in the variety show program from 8 p.m. to 9 p.m., or may further indicate that the user is interested in the variety show program from 8 p.m. to 9 p.m. on each Sunday.

The electronic device 100 may properly predict a behavior of the user based on the user preference information of the user. If the electronic device 100 determines that a set of information associated with the key character includes information associated with the user preference information, it is more likely that the user is interested in the information, and the electronic device 100 selects target information associated with the user preference information from all information associated with the key character and displays the target information to the user, to improve information display accuracy.

For example, if the key character is "Journey to the West", the electronic device 100 may determine that information in different fields such as a movie, an animation, a game, a novel, and music is associated with the key character. If the electronic device 100 determines, based on the user preference information, that the user is more interested in animation and game content, the electronic device 100 may display animation and game information related to "Journey to the West" to the user, to implement accurate display.

It should be understood that a manner of obtaining the user preference information is not limited in this application. For example, the electronic device 100 may determine the user preference information based on information such as a historical search record or a historical browsing record of the user, a locally stored file (such as a video file or an audio file), or a degree of preference of the user for historical display information, alternatively, the user may select interested content, tags, or types as the user preference information.

Manner 5: The characteristic information is current application scenario information of the electronic device 100.

The application scenario information is related to a current application scenario of the electronic device 100. For example, "motion" application scenario information may indicate that the current application scenario of the electronic device 100 is a motion scenario, and "driving" application scenario information may be used to indicate that the current application scenario of the electronic device 100 is a user driving scenario. For different application scenarios, the user may know that the electronic device 100 may have different intentions of obtaining the key character. For example, in an application scenario of text chat such as an SMS message, qq, or WeChat, when obtaining the key character, the user is more likely to want to locally obtain a record related to the key character, for example, in a scenario of a text chat with another person, the user is more likely to send a locally stored method of contact to the another person, or modify or edit the locally stored method of contact based on a chat content. Therefore, if the electronic device determines that the information associated with the key character is locally stored, the electronic device may display the locally stored information as the target information.

In addition, an association relationship between the application scenario and the information associated with the key character may be further reflected in the following aspects: If the electronic device 100 is in a motion scenario, a display success rate of displaying motion field information (such as game news and athlete information) by the electronic device 100 based on the key character is higher. In this case, the motion field information associated with the key character may be used as the target information. If the electronic device 100 is in a scenario such as driving or music playing, a display success rate of displaying music-related information (e.g., playing music associated with the key character) by the electronic device 100 based on the key character is higher. In this case, music field information associated with the key character may be used as the target information.

The foregoing association between the application scenario and the information is merely an example for description. The association relationship between the application scenario and the target information may be preset in the electronic device 100, or the user may create, modify, or delete the association relationship between the application scenario and the target information.

It should be understood that, in this illustrative example of this application, use of one piece of the foregoing characteristic information is not limited. The electronic device 100 may further combine several pieces of the characteristic information in the foregoing manner 1 to manner 4, and determine the target information based on the combination, to further improve precision of displaying the target information to the user.

For example, if the key character is "Zhang San", the characteristic information includes a method of contact that is stored in the electronic device 100 and that is associated with the key character, and at least one piece of information in the set of information associated with the key character is associated with a current application scenario of the electronic device 100. The electronic device 100 may obtain, from a network, related information of a plurality of characters named "Zhang San", and obtain the method of contact of "Zhang San" from a local address book. If the electronic device 100 further determines that the user is chatting with another person by using an SMS message, the electronic device 100 may display the method of contact that is of "Zhang San" and that is obtained from the local address book as the target information, so that the user can copy and edit the method of contact of Zhang San in the SMS message chat.

It should be understood that in the illustrative examples provided in this application, the methods provided in the illustrative examples of this application are described from a perspective in which the electronic device is used as an execution body. To implement functions in the methods provided in the illustrative examples of this application, the electronic device may include a hardware structure and/or a software module, and implement the functions in a form of the hardware structure, the software module, or a combination of the hardware structure and the software module. Whether a specific function in the foregoing functions is performed by the hardware structure, the software module, or the combination of the hardware structure and the software module depends on a specific application and a design constraint of the technical solutions.

Figure 6:
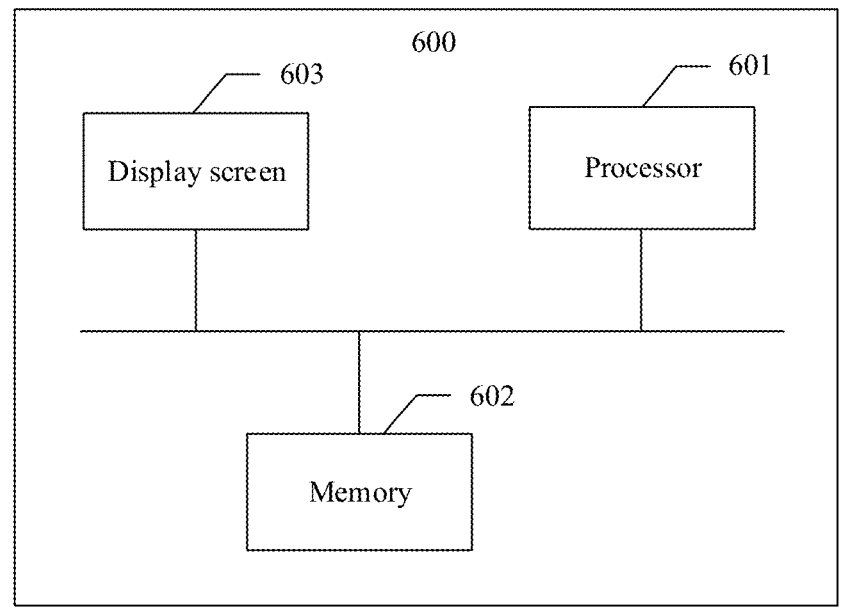
FIG. 6 is a schematic structural diagram of a terminal according to an illustrative example of this application.

Based on a same concept, FIG. 6 shows an electronic device 600 according to this application. For example, the electronic device 600 includes at least one processor 601, a memory 602, and a display screen 603. The processor 601 is coupled to the memory 602 and the display screen 603. The coupling in this illustrative example of this application is an indirect coupling or communication connection between apparatuses, units, or modules, and may be in an electrical, mechanical, or another form, and is used for information exchange between the apparatuses, units, or modules.

In implementation, the memory 602 may be configured to store a program instruction, and the display screen 603 may be configured to implement a display function of the electronic device 600. When the processor 601 is configured to invoke the program and the instruction that are stored in the memory 602, with reference to the display screen 603, the electronic device 600 is enabled to perform the steps performed by the electronic device in the information display method shown in FIG. 3 and/or FIG. 5, to improve a degree of interest of the user in displayed information.

Specifically, the memory 602 may have a function of the internal memory 121 of the electronic device 100 in the foregoing method illustrative example, for example, storing program code or an instruction. The processor 601 may have a function of the processor 110 of the electronic device 100 in the foregoing method illustrative example. For example, the processor 601 may invoke the program code and the instruction that are stored in the memory 602, to perform the steps shown in the S101 to the S103 in the method shown in FIG. 3, and/or perform the steps shown in the S201 to the S205 in the method shown in FIG. 5. The display screen 603 may have a function of the display screen 194 of the electronic device 100 in the foregoing method illustrative example. For example, the display screen 603 may be configured to perform the step shown in the S104 in the method shown in FIG. 3, and/or perform the steps shown in the S206 to the S208 in the method shown in FIG. 5.

A person of ordinary skill in the art may clearly know that the illustrative examples of this application may be implemented through hardware, firmware, or a combination thereof. When the illustrative examples of this application are implemented by software, the foregoing functions may be stored in a computer-readable medium or transmitted as one or more instructions or code in a computer-readable medium. The computer-readable medium includes a computer storage medium and a communications medium, and the communications medium includes any medium that enables a computer program to be transmitted from one place to another place. The storage medium may be any available medium accessible to a computer. This is used as an example but is not limited to: The computer-readable medium may include a RAM, a ROM, an electrically erasable programmable read-only memory (EEPROM), a compact disc read-only memory (CD-ROM) or another compact disc storage, a magnetic disk storage medium or another magnetic storage device, or any other medium that can be configured to carry or store desired program code in a form of an instruction or a data structure and that can be accessed by a computer. In addition, any connection may be appropriately defined as the computer-readable medium. For example, if software is transmitted from a website, a server, or another remote source by using a coaxial cable, an optical fiber/cable, a twisted pair, a digital subscriber line (DSL), or wireless technologies such as infrared, radio, and microwave, the coaxial cable, the optical fiber/cable, the twisted pair, the DSL, or the wireless technologies such as infrared, radio, and microwave are included in a definition of a medium to which the coaxial cable, the optical fiber/cable, the twisted pair, the DSL, or the wireless technologies such as the infrared ray, the radio, and the microwave belong. A disk and a disc that are used in the illustrative examples of this application include a compact disc (CD), a laser disc, an optical disc, a digital video disc (DVD), a floppy disk, and a Blu-ray disc. The disk usually magnetically copies data, and the disc optically copies data in a laser manner. The foregoing combination shall also be included in the protection scope of the computer-readable medium.

Figure 7:
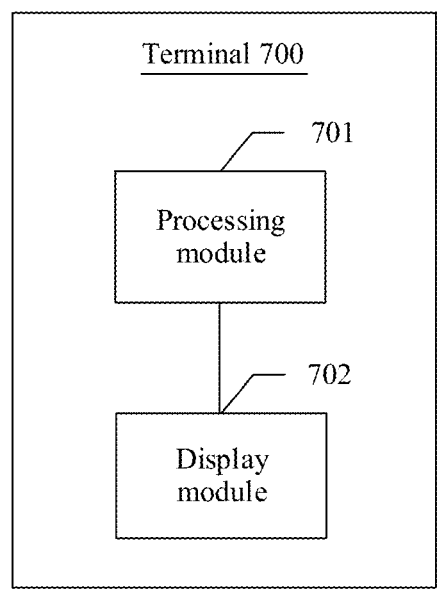
FIG. 7 is a schematic structural diagram of another terminal according to an illustrative example of this application.

It should be understood that a function of the terminal shown in this illustrative example of this application may be further implemented by using a modular structure. As shown in FIG. 7, the terminal 700 includes a processing module 701 and a display module 702. The processing module 701 may be configured to perform a processing process in this illustrative example of this application. Specifically, the processing module 701 may be configured to perform the steps performed by the processor 601 shown in FIG. 6. The display module 702 may be configured to perform a display process in this illustrative example of this application. For example, the display module 702 may be configured to perform the step performed by the display screen 603 shown in FIG. 6. The processing module 701 and the display module 702 each may include a storage module, or share a same storage module. This is not specifically limited in this application.

In summary, what are described above are merely illustrative examples of this application, but are not intended to limit the protection scope of this application. Any modification, equivalent replacement, or improvement made according to the disclosure of this application shall fall within the protection scope of this application.

What is claimed is:

1. An information display method, carried out by a terminal including a display screen, wherein the method comprises:
   displaying a first user interface on the display screen;
   obtaining a first operation entered by a user;
   obtaining recognized text by performing text recognition on content displayed on the display screen in accordance with the first operation entered by the user;
   obtaining word segmentations by performing word segmentation on the recognized text;
   determining at least one key character based on the word segmentations;
   obtaining characteristic information based on the at least one key character, wherein the characteristic information comprises a current application scenario information of the terminal;
   determining a current operating scenario of the terminal;
   displaying, in a second user interface on the display screen in accordance with the current operating scenario of the terminal, target information that is in a set of information associated with:
      the at least one key character, and
      the characteristic information;
   wherein, during the displaying target information, target information is displayed in the second user interface by:
      displaying, in accordance with the terminal being in a motion scenario, motion field information associated with the at least one key character, and
      displaying, in accordance with the terminal being in a driving scenario or a music playing scenario, music-related information associated with the at least one key character.

2. The method according to claim 1, wherein the set of information associated with the at least one key character is obtained from a network.

3. The method according to claim 1, wherein the method further comprises:
   displaying at least part of the word segmentations on a word segmentation interface; and
   selecting, based on a second operation, a key character of the at least one key character from the word segmentations displayed on the word segmentation interface.

4. The method according to claim 3, wherein the method further comprises:
   displaying a virtual key on the word segmentation interface,
   wherein the virtual key comprises one or more instruction options taken from the group consisting of: search, copy, share, and more.

5. The method according to claim 1, the method further comprising:
   determining information in different fields associated with the at least one key character,
   wherein the set of information comprises the information determined in the different fields.

6. The method according to claim 5, wherein the field associated with the at least one key character comprises one or more of the group consisting of:
   a movie,
   an animation,
   a game,
   a novel, and
   music.

7. The method according to claim 1,
   wherein the set of target information comprises different characteristic information; and
   wherein the different characteristic information comprises a method of contact associated with a key character of the at least one key character displayed in an information box form,
   wherein the method of contact is taken from the group consisting of:
      an email address, wherein the method further comprises displaying second information that is used to query the user whether to send an email to the email address; and an SMS message number, wherein the method further comprises displaying third information that is used to query the user whether to send an SMS message to the SMS message number.

8. The method according to claim 1, wherein the characteristic information further comprises one or more of the information types taken from the group consisting of:
a communication record associated with the at least one key character;
a search record associated with the at least one key character;
any one or more pieces of user preference information in a user preference information set, wherein the user preference information is used to indicate content that the user is interested in; and
application scenario information of the terminal, wherein the application scenario information is related to a current application scenario of the terminal.

9. The method according to claim 8, wherein the displaying a set of information, in accordance with the characteristic information comprising a search record associated with the at least one key character, comprises displaying at least one of the group consisting of:
the search record; and
an index of content that is in the search record and that is browsed by the user.

10. The method according to claim 8, wherein:
the displaying a set of information, in accordance with the characteristic information comprising any one or more pieces of user preference information in a user preference information set, comprises displaying information that is in a set of information associated with the at least one key character and that is associated with the any one or more pieces of user preference information; or
the displaying a set of information, in accordance with the characteristic information the displaying a set of information, in accordance with the characteristic information comprising application scenario information of the terminal, comprises displaying information that is in the set of information associated with the at least one key character and that is associated with the application scenario information.

11. The method according to claim 1, wherein the first user operation is an operation taken from the group consisting of:
a single-finger touch and hold operation,
a multi-finger touch and hold operation,
a single-finger slide operation, and
a multi-finger slide operation.

12. The method according to claim 1, wherein the different characteristic information comprises a method of contact associated with the key character in an information box form, and wherein the method of contact comprises a phone number.

13. A device, comprising:
a memory,
a processor, and
a touch screen display,
wherein the memory is configured to store computer-executable program code that, when invoked by the device, causes the device perform a method comprising:
displaying a first user interface on the display screen;
obtaining a first operation entered by a user;
obtaining recognized text by performing text recognition on content displayed on the display screen in accordance with the first operation entered by the user;
obtaining word segmentations by performing word segmentation on the recognized text;
determining at least one key character based on the word segmentations;
obtaining characteristic information based on the at least one key character, wherein the characteristic information comprises a current application scenario information of the terminal;
determining a current operating scenario of the terminal;
displaying, in a second user interface on the display screen in accordance with the current operating scenario of the terminal, target information that is in a set of information associated with:
the at least one key character, and
the characteristic information;
wherein, during the displaying target information, target information is displayed in the second user interface by:
displaying, in accordance with the terminal being in a motion scenario, motion field information associated with the at least one key character, and
displaying, in accordance with the terminal being in a driving scenario or a music playing scenario, music-related information associated with the at least one key character.

14. The device according to claim 13, wherein the method further comprises:
displaying at least part of the word segmentations on a word segmentation interface; and
selecting, based on a second operation, a key character of the at least one key character from the word segmentations displayed on the word segmentation interface.

15. The device according to claim 14, wherein the method further comprises:
displaying a virtual key on the word segmentation interface,
wherein the virtual key comprises one or more instruction options taken from the group consisting of: search, copy, share, and more.

16. The device according to claim 13, the method further comprising:
determining information in different fields associated with the at least one key character;
wherein the set of information comprises the information determined in the different fields, and
wherein the field associated with the at least one key character comprises one or more of the group consisting of: a movie, an animation, a game, a novel, and music.

17. The device according to claim 13,
wherein the set of target information comprises different characteristic information; and
wherein the different characteristic information comprises a method of contact associated with a key character of the at least one key character displayed in an information box form,
wherein the method of contact is taken from the group consisting of:
an email address, wherein the method further comprises displaying second information that is used to query the user whether to send an email to the email address; and an SMS message number, wherein the method further comprises displaying third information that is used to query the user whether to send an SMS message to the SMS message number.

18. The device according to claim 13, wherein the characteristic information further comprises one or more of the information types taken from the group consisting of:
a communication record associated with the at least one key character;
a search record associated with the at least one key character;
any one or more pieces of user preference information in a user preference information set, wherein the user preference information is used to indicate content that the user is interested in; and
application scenario information of the terminal, wherein the application scenario information is related to a current application scenario of the terminal.

19. The device according to claim 13, wherein the different characteristic information comprises a method of contact associated with the key character in an information box form, and the method of contact comprises a phone number.

20. A non-transitory computer-readable storage medium comprising computer-executable instructions, that when run on a computer, cause a device comprising the computer to perform a method comprising:
displaying a first user interface on the display screen;
obtaining a first operation entered by a user;
obtaining recognized text by performing text recognition on content displayed on the display screen in accordance with the first operation entered by the user;
obtaining word segmentations by performing word segmentation on the recognized text;
determining at least one key character based on the word segmentations;
obtaining characteristic information based on the at least one key character, wherein the characteristic information comprises a current application scenario information of the terminal;
determining a current operating scenario of the terminal;
displaying, in a second user interface on the display screen in accordance with the current operating scenario of the terminal, target information that is in a set of information associated with:
the at least one key character, and
the characteristic information;
wherein, during the displaying target information, target information is displayed in the second user interface by:
displaying, in accordance with the terminal being in a motion scenario, motion field information associated with the at least one key character, and
displaying, in accordance with the terminal being in a driving scenario or a music playing scenario, music-related information associated with the at least one key character.

21. The non-transitory computer-readable storage medium according to claim 20, wherein the set of information associated with the at least one key character is obtained from a network.

* * * * *